United States Patent
Cohen

(12) 
(10) Patent No.: US 6,432,329 B1
(45) Date of Patent: *Aug. 13, 2002

(54) METHODS OF MANUFACTURING GRANULAR COMPOSITIONS

(76) Inventor: Yoav Cohen, 101 Waite St. #C3, Malden, MA (US) 02148

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,268

(22) Filed: Feb. 27, 1998

(51) Int. Cl.$^7$ .................................................. B29B 9/08
(52) U.S. Cl. .................. 264/6; 264/7; 264/8; 264/117; 427/212; 427/220
(58) Field of Search ............................ 264/5, 6, 10, 12, 264/13, 14, 117, 7, 8; 427/212, 214, 215, 220, 221

(56) References Cited

U.S. PATENT DOCUMENTS

| | | | | |
|---|---|---|---|---|
| 4,069,287 A | * | 1/1978 | Aboulafia et al. | 264/13 |
| 4,218,411 A | * | 8/1980 | Price et al. | 264/14 |
| 4,364,515 A | * | 12/1982 | Prussin | 239/8 |
| 4,801,411 A | * | 1/1989 | Wellinghoff et al. | 264/13 |
| 4,851,137 A | * | 7/1989 | Weinstein | 264/117 |
| 5,207,954 A | * | 5/1993 | Lewis et al. | 264/117 |
| 5,268,283 A | * | 12/1993 | Mothes et al. | 435/144 |
| 5,275,773 A | * | 1/1994 | Irie et al. | 264/141 |
| 5,529,710 A | * | 6/1996 | Van Dijk et al. | 264/117 |

* cited by examiner

Primary Examiner—Bret Chen
(74) Attorney, Agent, or Firm—Wolf, Greenfield and Sacks, P.C.

(57) ABSTRACT

The present invention relates to novel granules and novel methods for manufacturing such granules. In particular, the invention describes granules formed by the agglomeration of resin wetted powder. When the powder is aerated before applying the resin to the powder, granules that are densely packed and homogeneous throughout are formed through agglomeration conditions. The densely packed granules are free of air bubbles greater than 10 microns in diameter. Such novel granules are useful in the manufacture of fabricated products of superior quality.

17 Claims, 1 Drawing Sheet

METHODS OF MANUFACTURING GRANULAR COMPOSITIONS

FIELD OF THE INVENTION

In general the present invention relates to novel granules and novel methods for manufacturing such granules. In particular aspects, the invention relates to agglomerated granules that contain powder and resin that are homogeneous and compact as well as round and smooth. Such novel granules are useful, inter alia, in the manufacture of fabricated products of superior quality.

BACKGROUND OF THE INVENTION

Plastic polymers are well-known in the art. Due to their low cost relative to natural materials thermosets and thermoplastics in particular are used extensively in the manufacture of fabricated tiles, table and countertops, walls, floors, fireplaces and an assortment of other products.

These fabricated products are routinely prepared by casting or molding a granular, curable synthetic resin composition that contains a filler. Typically, the synthetic resin constitutes 30%–50% of the mixture by weight, while the filler, and maybe an optional pigment, constitute between 50% and 70% of the mixture. The constituents of the mixture are usually mixed for 20 to 50 minutes and poured into a tray where the mixture is cured, often by the application of heat. Such curing may sometimes lead to "burning", thus rendering the product unusable. After the curing process, which can take hours, the cured material is cooled. In order to obtain granules of a desired size the cured material is broken with hammers or mechanical equipment, ground, and then pulverized. The pulverized material then is classified into different useful granule sizes. The resulting granules typically are not very compact (i.e., contain air-pockets), and are of irregular shapes and surfaces.

It can be appreciated that such methods are labor intensive, expensive, noisy, and grimy. Moreover, a material loss of between 10% and 20% is typically experienced, with ~10% of the material being reduced to an unusable fine powder and another ~10% being lost in the mixing, casting, breaking, and grinding processes.

SUMMARY OF THE INVENTION

The present invention provides novel granular compositions and methods used in manufacturing such compositions. Granules of the invention are compact and homogeneous, round and smooth, and can be prepared within a desired range of sizes. Such granules are useful in the manufacture of products that have superior qualities when compared to similar products in the prior art.

According to one aspect of the invention, a method is provided for forming granules of a powder and a liquid. A dry powder is aerated. A liquid is applied to the aerated powder to produce wetted particles of powder. The wetted particles are agglomerated under shear to produce the granules. It has been discovered, unexpectedly, that aerating the powder prior to applying the liquid to the aerated powder results in granules that are densely packed and homogeneous throughout.

In important embodiments of this invention, the method further involves curing the granules to produce cured granules when the liquid is a resin. One independent aspect of the invention is the application of curing conditions during the agglomeration step sufficient to substantially slow or arrest altogether further agglomeration, thereby determining particle size. In one particular embodiment, the agglomeration is carried out relatively slowly, over a period of at least one minute, under agglomeration and curing conditions to produce a batch of particles having an average particle size of between 8 and 140 mesh.

The method also can involve post-curing the granules after agglomeration has been arrested in a location remote from that where the agglomeration took place. Preferably the agglomeration step is carried out under forces sufficient to produce densely packed granules that are free of air bubbles greater than 10 microns in diameter.

The agglomeration can be carried in a variety of well known agglomeration devices, although the preferred device is a rotary blade mixer with 3, dull, spaced mixing blades.

As described in greater detail below, a variety of materials can be added to the powder, to the resin or to an agglomeration chamber to produce a variety of products. Likewise, different liquids other than resin can be applied to the powder to produce a variety of different products, also as discussed in greater detail below. The preferred liquid is a curable resin and the preferred embodiments include curing the granules, preferably during the agglomeration step as described above. In one particularly important embodiment, pigment is added whereby hard granules containing color are produced, such granules can be used in the manufacture of artificial stone products, e.g., counter tops, walls, furniture, cabinets, floors and the like.

According to another aspect of the invention, a method is provided for manufacturing granules of a particular size. The method involves introducing a dry powder into an agglomerator. A liquid resin also is introduced into the agglomerator. Agglomeration conditions are applied in the agglomerator to obtain granules formed of the powder and the resin. In addition, curing conditions are applied within the agglomerator to substantially slow or arrest further agglomeration. The powder is aerated before the liquid resin is added into the agglomerator. The liquid resin is added to the aerated powder either during the agglomeration conditions or before applying the agglomeration conditions. The conditions applied and the materials used are as described briefly above and in greater detail below.

According to another aspect of the invention, products are provided which are produced by any of the methods described above.

According to another aspect of the invention, a cured granule is provided. The granule is made of powder and a cured resin, wherein the surface of the granule is smooth, the shape of the granule is round, and wherein the granule is free of air bubbles having a diameter greater than 10 microns. More preferably, the granule is free of air bubbles having a diameter greater than 5 microns, and in some embodiments, the granule is free of air bubbles having a diameter greater than 1 micron. The granule can be a plurality of such granules formed as a batch or as batches and having an average mesh size of between 8 and 140. Such granules are free flowing. In another embodiment, the granule is free of pockets of unwetted powder. In still another embodiment, the granule contains a homogeneous dispersion of microbubbles having a diameter less than 1 micron. In still another embodiment, the powder can be between 60–95% by weight of the granule and the resin can be between 5–40% of the granule. In one important embodiment, the granule includes pigment and the pigment is present at 0.1–2.0% by weight of the granule. Most preferably, the powder is dispersed homogeneously throughout the granule.

In important embodiments, the granule contains an active agent. As used herein, an active agent is an agent that imparts a desirable property to the granule other than that provided by the powder, the resin and any catalyst for the resin. Thus, active agents can be food additives, natural flavoring agents, antioxidants, acidulants, colorants, odorants, enzymes, fingicides, biocides, nutrients, hormones, cells, chromatography medium, agglutination medium for diagnostics, nephelometric enhancers, immobilization matrices, herbicides, insecticides, pesticides, perfumes, animal feed supplements, fertilizers, surfactants, detergents, immunoassay reagents, and active pharmaceuticals. The granules of the present invention can contain the active agent homogeneously dispersed throughout the cured resin. The active agent can be present in the granule as microparticles. In one important embodiment, the active agent is present by weight of less than ½% or greater than 30% of the total weight of the granule. Prior to the present invention, it was not practical to achieve homogeneous dispersions of active agents below ½% or greater than 30% according to the methodologies used for forming granules in the prior art.

According to still another aspect of the invention, a composite is provided. The composite includes a layer of cured resin having a resin specific gravity, and a plurality of round, cured granules dispersed throughout the cured resin, the cured granules having a granule specific gravity. The cured granules comprise a powder and a cured granule resin with the powder dispersed homogeneously throughout the cured granule resin. In this aspect of the invention, the resin specific gravity is within 10%, and preferably 5%, of the granule specific gravity. Thus, the invention involves new methods for making composites by selecting a resin for forming a layer of a cured resin and forming a plurality of round, cured granules to be dispersed throughout that resin, wherein the cured granules also have a specific gravity and that specific gravity is within 10% of the resin specific gravity. When the cured granules are mixed with the resin as a continuous phase for forming a layer, the cured granules are dispersed throughout the resin and do not float or sink, thereby producing a product with a consistency better than that achieved according to prior art methods.

These and other aspects of the invention are described in greater detail below.

DETAILED DESCRIPTION OF THE INVENTION

Figure 1:
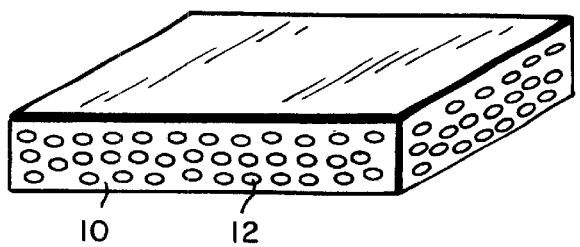
FIG. 1 is a schematic cross-sectional view through a composite of the invention.

FIG. 1 is a schematic cross-section of a composite according to the invention. As shown in FIG. 1, a layer 10 of cured resin includes dispersed therein a plurality of granules 12 according to the invention.

Figure 2:
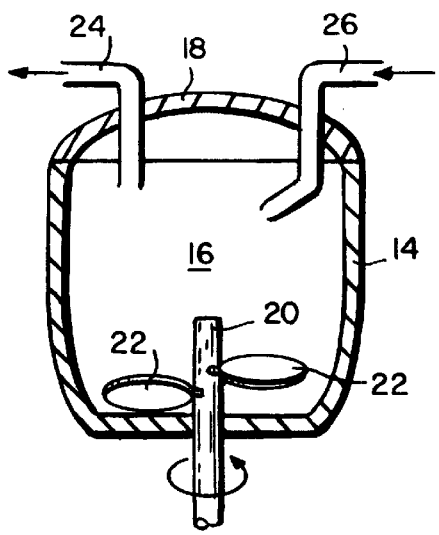
FIG. 2 is a schematic cross-sectional view through the device (high-shear mixer) used in the invention.

FIG. 2 is a schematic cross-section of the mixer used in the invention. The vessel (or bowl) 14 forms an air-tight chamber 16 when cover 18 is placed on top of the bowl. A vertical shaft 20 is situated at the center of the bottom of vessel 14. Radially attached to the vertical shaft 20 are blades 22. The blades 22 are preferably positioned in different horizontal planes from each other along the vertical shaft 20. A vacuum port 24 and an input port 26 are situated on cover 18. Input port 26 is used for the addition of the liquid resin and/or catalyst, and/or pigment according to the invention. Vacuum port 24 is used to extract water vapors that may be formed during the shearing of water-containing polymers.

Figure 3:
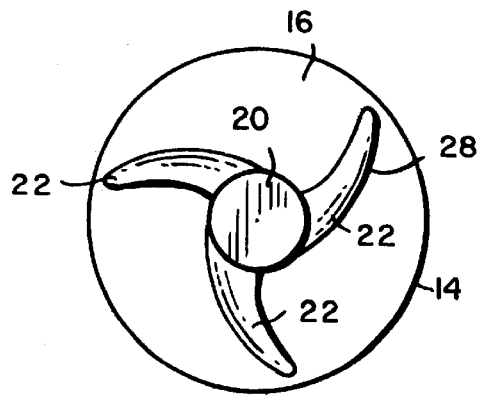
FIG. 3 is a schematic top-view of the device depicted in FIG. 2.

FIG. 3 is a schematic top-view of the device depicted in FIG. 2; The vertical shaft 20 can be seen with the blades 22 being radially attached to the shaft. Three blades are depicted in this particular view.

Figure 4A:
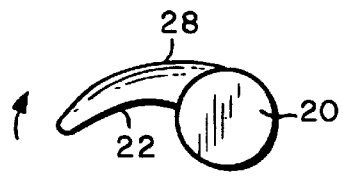
FIG. 4A is a schematic top-view of a blunt-blade from the vertical shaft of the device (high-shear mixer) used in the invention.
Figure 4B:
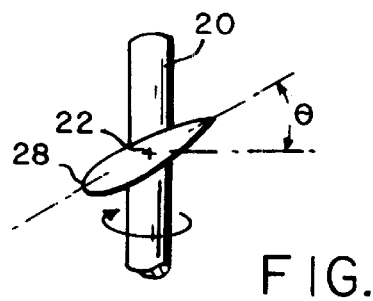
FIG. 4B is an enlarged schematic cross-sectional view of the blunt-blade depicted in FIG. 4A.

FIG. 4A is an enlarged schematic top-view of a blunt-blade 22 of the invention. The forward-impact blunt side 28 of blade 22 can be seen. FIG. 4B is an enlarged schematic cross-section view of blunt-blade 22. The forward-impact blunt blade side 28 is depicted. The angle θ ("angle of attack") between the plane of blade 22 and the horizontal plane is also depicted. Higher angles typically relate to the generation of higher shear forces.

The invention relates in one aspect to granules made using agglomeration, which granules have unexpected properties and advantages. Agglomeration is a process whereby discrete particles of a material are pushed together under a force to create aggregates of such particles. The force can be, for example, centrifugal force. The particles are held together as aggregates by at least a variety of physico/chemical forces, such as Van der Wall forces, steric forces, ionic forces, etc. The particles initially can be caused to be attracted to one another by agglomerating under shear conditions, whereby the particles become charged (through friction) and are attracted to one another electrostatically. The particles can also be caused to be attracted to one another by wetting the particles. In one particular embodiment, the particles are wetted with a resin (polymer), whereby the agglomerated particles or "granules" can be cured to produce hard, cured granules.

The agglomeration is carried out in an agglomerator, which is a device for applying forces to particles to cause them to agglomerate. Such forces can be from rotating disks, gas streams, blades, etc. The preferred agglomerator is a rotary blade agglomerator operated at moderate speeds and with 3, blunt, angled blades (versus sharp horizontal blades as would be characteristic of a food processor). The device is described above and in the Examples below.

High shear agglomerators of the prior art are continuous processors which cause granule formation in a matter of seconds. The preferred agglomerator, however, according to the present invention, creates turbulence, shear and forces whereby agglomeration occurs more slowly, typically over more than one minute. The agglomerator of the present invention is operated in batches, not continuously.

One important aspect of the invention involves aerating powder before applying the liquid to the powder. The powder is aerated by first introducing it into the agglomerator outside of the presence of any liquid and operating the agglomerator at a low speed. This causes the volume of the powder introduced into the chamber to increase. Typically it increases by at least 25%, 33%, 50% and even as much as 100%. Thus, aerated powder is powder occupying a volume of at least 25%, preferably 33%, more preferably 50% and most preferably about 100% more than the volume occupied by the powder in its more dense packed form.

When aerated powder is used instead of nonaerated powder, extremely desirable results are achieved according to the invention. It was unexpected that aeration would be important to certain properties of granules formed according to the invention, and, in particular, the homogeneity of the formed granules.

Another important and independent aspect of the invention relates to accelerating the curing conditions during agglomeration sufficient to slow and even arrest further agglomeration. This results in formed particles which are more uniform in size. The particles also may be more consistent from their surface throughout the particle by applying such conditions. In addition, arresting the growth of a batch of granules at a particular size is possible using this methodology. Finally, post-curing can be avoided by applying curing conditions to the particles while they are within the agglomerator.

Curing may be accelerated in numerous ways, including increasing the catalyst concentration, applying light for light activated catalysts and resins, and increasing heat by, for example, higher shear forces, externally supplied hot air, microwave radio-frequency or heating directly the agglomeration chamber.

Although the foregoing steps can cause curing during agglomeration, it also is possible to include an additional post-curing step. This may be desirable if the resins are not completely cured in the agglomerator.

It is noted that a variety of variables are interrelated and contribute to the speed at which the particles agglomerate, the time at which agglomeration is halted and the properties of resulting product. These variables include the shear force, the concentration of the catalyst, the amount of resin versus the amount of powder, the type of resin and the type of powder used, the time during which agglomeration is carried out, the temperature conditions during agglomeration, the timing of the addition of external inducing agents (e.g. light) and the like. For example, as will be recognized by one of ordinary skill in the art, increasing the weight % of the resin will cause the formation of larger granules.

It is noted that in most embodiments, once the powder has been aerated then the liquid can be added to the agglomeration chamber during agglomeration conditions or prior to commencing agglomeration conditions. In the latter case, the powder first would be aerated and the rotary mixer, for example, then would be turned off. The chamber then would be opened and liquid resin could be introduced into the chamber. The agglomerator then would be turned on again. In the former situation, liquid can be sprayed into the agglomeration chamber while the agglomerator is in operation. I have found, however, that if the resin/catalyst mixture (plus agent, if any) is in an emulsion, then it is better to add the mixture while the agglomerator is in operation. If the emulsion is added when the agglomerator is turned off and then agglomeration conditions are applied, then the emulsion tends to separate and the densely packed, homogeneous granules of the invention may not be obtained.

According to the invention, the agglomeration conditions applied are slower than the high-shear conditions typical of high-shear agglomerators of the prior art. In the present invention, agglomeration occurs over a period of at least about 30 seconds, more typically more than 1 minute and often 2 minutes or more. It is believed that this slower agglomeration results in a better, more uniform product.

The formed particles may have any one of a variety of desirable properties. The most important characteristic of the preferred particles is that they are densely packed and homogeneous throughout. By being densely packed, they are characterized by the absence of air bubbles greater than 10 microns. Preferably there are no air bubbles present that are greater than 5 microns and most preferably there are no air bubbles present greater than 1 micron. Likewise, the particles seem to be more uniformly wetted following the procedures of the invention, whereby the formed granule is free of pockets of unwetted powder. This can be examined in a variety of ways. A simple way is by crushing a formed granule. If a granule of the prior art is crushed, it is easy to observe the presence of powder which escapes the granule as the granule is crushed. When granules of the present invention are crushed, they simply break apart into smaller sizes and do not release appreciably any powder previously unwetted and trapped inside. Another characteristic is that the microbubbles present are homogeneously distributed throughout the microparticle and the wetted microparticles likewise are homogeneously distributed throughout the granule.

Thus, one isolated portion of the granule tends to look just like and have the properties of any other isolated portion of the granule. The granules are preferably smooth, hard and round. Granules of 50 barcol are not uncommon.

The methods of the invention permit various advantages, depending on which aspect of the invention is being taken advantage of. Because of the greater homogeneity achieved using the methods of the invention, active agents present by weight at less than ½% and present by weight at more than 30% can be distributed homogeneously throughout the granules. Such homogeneous distribution of such amounts was not achievable according to the methods of the prior art. It is also possible to more readily control the size of the granules. By controlling the size, one can achieve a batch or batches of greater uniformity. This can be important, for example, where the granules are made of thermoplastic materials intended to flow into and fill out molds for injection molding. There is less waste as well, since the proper and desired size of the granules is achieved. It is also possible to readily control the specific gravity of the formed granules. Because the invention easily permits the alteration of the weight percent of the resin, the weight percent of the powder and the density of the packing of the material, granules can be produced to have a particular specific gravity.

One utility for creating granules of a defined specific gravity is in connection with the manufacture of composites using such granules. One such composite could be an artificial stone product. Artificial stone products are often formed of layers of resin constituting a continuous phase into which small particles of crushed stone are added to achieve an overall appearance of a stone product when the resin has cured. In U.S. Pat. No. 5,055,327, to Baskin, the entire disclosure of which is incorporated herein by reference, uncured granules of overfilled resin are added in place of crushed stone to a continuous phase of resin, and the two materials then are cured. Thus, an artificial stone product can be manufactured without using any natural stone elements whatsoever. One drawback in attempting to manufacture such materials is that such synthetic granules or natural crushed stone granules do not have the same specific gravity as the continuous phase of resin with which they are mixed. Therefore, the granules tend to sink to the bottom or float to the top surface of the resin. This creates an appearance that diminishes from the natural appearance which is sought to be achieved.

By controlling the specific gravity of the granule, according to the present invention, the specific gravity of the granules can be controlled, whereby granules are produced that have the same specific gravity as the resin with which they will be mixed. In this manner, the settling or floating problem can be avoided.

Although the liquid may be water, an aqueous solution, or any other liquid suitable for use in an agglomeration procedure, the preferred liquids are curable liquid resins.

Important curable resins are thermosets and thermoplastics used to describe thermoset-resins and thermoplastic-polymers based on their structural and physical properties.

Thermoset resins are those that change irreversibly under the influence of heat from a fusible and soluble material into one which is infusible and insoluble through the formation of a covalently-crosslinked, thermally-stable network. In practice, crosslinking reactions may take place during the fabrication of articles. Thermosets include unsaturated polyester resins, epoxy resins and polyurethanes, phenolic and amino resins, silicone resins, alkyd resins, plasticizing resins, drying resins, hard resins, allyl resins, diallyl phthalate resins, allyl diglycol carbonate resins, and furane resins.

Virtually any curable thermoset resin may be used in carrying out the invention. Dependant upon the desired characteristics of the final product, different combinations of the curable thermoset resins may also be used according to the invention.

Thermoplastic polymers are not crosslinked (i.e. linear or branched), can usually be dissolved in some solvent, and in most instances they will melt and flow under the application of heat and pressure, the changes being reversible. Thermoplastics include three major categories of polymers: hydrocarbon plastics and elastomers, carbon-chain polymers, and heterochain thermoplastics. Hydrocarbon plastics and elastomers include polyethylene, polypropylene, olefin-based polymers and copolymers, natural rubber and other polyisoprenes, rubbers derived from butadiene, and other synthetic elastomers such as polyisobutylene and butyl rubber, and polychloroprene (neoprene). Carbon-chain polymers include polystyrene and related polymers, acrylic polymers, poly(vinyl esters) and derived polymers, chlorine-containing polymers, and fluorine-containing polymers. Heterochain thermoplastics include polyamides and polypeptides, polyesters-polyethers-and-related polymers, cellulosic polymers, high-temperature and inorganic polymers.

Virtually any thermoplastic polymer may be used in carrying out the invention. Dependant upon the desired characteristics of the final product different combinations of the thermoplastic polymers may be used according to the invention.

Specific examples for each of the above polymer categories can be found in the "Textbook of Polymer Science" by Billmeyer, F. W., Jr., 3rd Edition, 1984, John Wiley & Sons, New York, whose contents are incorporated herein in their entirety by reference. Additional information regarding industry nomenclature and common name usage can be found in the *Modern Plastics Encyclopedia*.

Preferably, the liquid resin is an unsaturated polyester, an epoxy or a polyurethane resin, a urea-formaldehyde (BAKALITE), a melamine (phenolic resin), or the thermoplastic acrylic methyl methacrylate (MMA).

A catalyst may be added to the thermoset resin. The catalyst may be any of the polymerization catalysts or mixtures thereof well recognized in the art. For example, the catalyst may be a peroxide, an amine, a urethane, or any other suitable catalyst, and is chosen depending upon the resin being utilized. Thus, where the liquid resin is an unsaturated polyester, the catalyst might be a peroxide. Where the resin is an epoxy, an amine would be typically used as the catalyst. A urethane type catalyst would typically be used for urethane and urea-formaldehyde resins. Typically, the catalyst will constitute by weight less than 2% of the resin itself, and hence less than 0.5% of the entire granule. Preferably, the amount of catalyst added will be between 0.2% and 1.2% by weight of the resin.

In addition to the resin and catalyst, it is sometimes desirable to add a pigment. Different liquid or powder pigments are known, although a polyester-dispersed liquid pigment is preferred for an unsaturated polyester resin while finely-divided powder pigments are preferred for use with other resins. Such color pigments are commonly known and readily available. Most preferably, the selected polyester-dispersed liquid pigment is one obtained from American Colors of Sandusky, Ohio. The pigment, if utilized, typically constitutes no more than about 2% of the entire granule, and preferably is limited to between 0.1% and 1% of the entire granule.

The powders useful in forming the granular compositions of the invention may be any one of the powders well known to those skilled in the art including talc, pulverized quartz, fine silica, synthetic precipitated silica, synthetic fumed silica, walastonite, diatomaceous earth, gypsum, powdered glass, clay minerals such as china clay (kaolin), illite, powdered chalk, powdered marble, calcium carbonate, aluminum silicate, calcium silicate, boracite, and aluminum trihydrate. The latter, aluminum trihydrate, conferring excellent fire resistance properties to the final product is the preferred powder. While powders having a mean diameter particle size of between 1 and 200 microns are most common, powders having a mean diameter of between 5 and 50 microns are preferred for use.

When used for decorative purposes, the powder can contribute to the color, transparency, and surface properties of the cured composition. Therefore, it is appropriate to use different powders when fabricating different products.

The granular composition of the invention is also useful as a time-release, delayed-release or sustained-release vehicle for delivering a variety of active agents. The granules also can be used in oral formulations as oral medicaments. "Active agents" according to the invention include food additives, natural flavoring agents, antioxidants, acidulants, colorants, odorants, enzymes, fungicides, biocides, nutrients, hormones, cells, chromatography medium, agglutination medium for diagnostics, nephelometric enhancers, immobilization matrices, herbicides, insecticides, pesticides, perfumes, animal feed supplements, fertilizers, surfactants, detergents, immunoassay reagents, and active pharmaceuticals.

Examples of categories of active pharmaceuticals include: adrenergic agent; adrenocortical steroid; adrenocortical suppressant; alcohol deterrent; aldosterone antagonist; amino acid; ammonia detoxicant; anabolic; analeptic; analgesic; androgen; anesthesia, adjunct to; anesthetic; anorectic; antagonist; anterior pituitary suppressant; anthelmintic; anti-acne agent; anti-adrenergic; anti-allergic; anti-amebic; anti-androgen; anti-anemic; anti-anginal; anti-anxiety; anti-arthritic; anti-asthmatic; anti-atherosclerotic; antibacterial; antibiotic; anticancer; anticholelithic; anticholelithogenic; anticholinergic; anticoagulant; anticoccidal; anticonvulsant; antidepressant; antidiabetic; antidiarrheal; antidiuretic; antidote; anti-emetic; anti-epileptic; anti-estrogen; antifibrinolytic; antifungal; antiglaucoma agent; antihemophilic; antihemorrhagic; antihistamine; antihyperlipidemia; antihyperlipoproteinemic; antihypertensive; antihypotensive; anti-infective; anti-infective, topical; antiinflammatory; antikeratinizing agent; antimalarial; antimicrobial; antimigraine; antimitotic; antimycotic, antinauseant, antineoplastic, antineutropenic, antiobessional agent; antiparasitic; antiparkinsonian; antiperistaltic, antipneumocystic; antiproliferative; antiprostatic hypertrophy; antiprotozoal; antipruritic; antipsychotic; antirheumatic; antischistosomal; antiseborrheic; antisecretory; antispasmodic; antithrombotic; antitussive; anti-ulcerative; anti-urolithic; antiviral; appetite suppressant; benign prostatic hyperplasia therapy agent; blood glucose regulator; bone resorption inhibitor; bronchodilator; carbonic anhydrase inhibitor; cardiac depressant; cardioprotectant; cardiotonic; cardiovascular agent; choleretic; cholinergic; cholinergic agonist; cholinesterase deactivator; coccidiostat; cognition adjuvant; cognition enhancer; depressant; diagnostic aid; diuretic; dopaminergic agent; ectoparasiticide; emetic; enzyme inhibitor; estrogen; fibrinolytic; fluorescent agent; free oxygen radical scavenger; gastrointestinal motility effector; glucocorticoid; gonad-stimulating principle; hair growth stimulant; hemostatic; histamine H2 receptor antagonists; hormone; hypocholesterolemic; hypoglycemic; hypolipidemic; hypotensive; imaging agent; immunizing agent; immunomodulator; immunoregulator; immunostimulant; immunosuppressant; impotence therapy adjunct; inhibitor; keratolytic; LHRH agonist; liver disorder treatment; luteolysin; memory adjuvant; mental performance enhancer; mood regulator; mucolytic; mucosal protective agent; mydriatic; nasal decongestant; neuromuscular blocking agent; neuroprotective; NMDA antagonist; non-hormonal sterol derivative; oxytocic; plasminogen activator; platelet activating factor antagonist; platelet aggregation inhibitor; post-stroke and post-head trauma treatment; potentiator; progestin; prostaglandin; prostate growth inhibitor; prothyrotropin; psychotropic; pulmonary surface; radioactive agent; regulator; relaxant; repartitioning agent; scabicide; sclerosing agent; sedative; sedative-hypnotic; selective adenosine A1 antagonist; serotonin antagonist; serotonin inhibitor; serotonin receptor antagonist; steroid; stimulant; suppressant; symptomatic multiple sclerosis; synergist; thyroid hormone; thyroid inhibitor; thyromimetic; tranquilizer; amyotrophic lateral sclerosis agent; cerebral ischemia agent; Paget's disease agent; unstable angina agent; uricosuric; vasoconstrictor; vasodilator; vulnerary; wound healing agent; xanthine oxidase inhibitor.

Active agents may be in powder form and therefore be incorporated with the powder of the invention, or in liquid form and be incorporated with the resin component.

EXAMPLES

The agglomeration process is performed in a vertical shaft high-shear mixer such as model VCM40 from Stefan Machinery, GERMANY, or model RB40 from RobotCoup, FRANCE. The blades of such mixers are blunted so that the resulting agglomerate granules remain intact.

The dry powder is added into the bowl, typically up to a ⅓ volume of the bowl, and after the bowl is covered so that the powder is prevented from being blown away, the impeller is rotated at a speed of 1,000–1,500 rpm for a time between 20 sec to 2 min in order to aerate the powder. If the final product requires the addition of a pigment, then a pigment in powder-form is added to the dry powder. The liquid resin and, optionally as required the catalyst, are then added to the aerated powder mixture at the higher speed of between 3,000–4,000 rpm, preferably 3,500 rpm) until the liquid resin constitutes between 5% and 40% by weight of the resulting mixture. The bowl is optionally heated to facilitate curing of the granules, therefore slowing or even arresting further agglomeration. This stage of the operation depends upon the resin used, the presence of a catalyst and the temperature of the granule. Once a desired size for the granule is achieved the granules may be cooled and sieved. Typically, to achieve granules between 8–140 mesh in size, it takes high shear mixing for approximately 3–4 min after the resin and/or catalyst is added at ~3,500 rpms.

Example 1

Product with Structural Strength

Filler: Aluminum trihydrate—FRF 20 with a mean diameter of 15$\mu$ was obtained from Alcan Aluminum, Ohio.

Base resin: ISO NPG-based unsaturated polyester of 1,400 or 1,500 centipoise was obtained from Ashland, Teterborough, N.J.

Catalyst: Benzoyl Peroxide at 50% concentration was obtained from AtoChem, Mamaroneck, N.Y.

Pigment: Phtalo-Cyanide Blue powder was obtained from Ciba-Geigy (Novartis) Greensboro, N.C.

| constituent | weight percentage |
| --- | --- |
| Aluminum Trihydrate | 84.5 |
| ISO NPG-based unsaturated polyester | 15.0 |
| Phtalo-Cyanide Blue powder | 0.4 |
| Benzoyl Peroxide | 0.1 |
| | 100.0 |

Example 2

Product with High Heat Resistance

Filler: Calcium Carbonate with a mean diameter of 20$\mu$ was obtained from H.M. Royal, NJ.

Base resin-1: Polyisocyanate resin was obtained from S.C. Johnson Polymers, WI.

Base resin-2: JONCRYL '601, an acrylate based oligomer resin in 5% solvent was obtained from S.C. Johnson Wax, WI. (provides flexibility to granule).

Base resin-3: Polyol resin was obtained from S.C. Johnson Polymers, WI.

Catalyst: HT34 amine was obtained from AirProducts, Inc., OH.

| constituent | weight percentage |
| --- | --- |
| Calcium Carbonate | 82.5 |
| PolyIsoCyanate | 10.0 |
| JONCRYL '601 | 5.0 |
| Polyol | 2.0 |
| HT34 Amine Catalyst | 0.5 |
| | 100.0 |

Example 3

Product with Durability and Flexibility

Filler: Aluminum Trihydrate—with a mean diameter of 25$\mu$ was obtained from Alcan Aluminum, OH.

Base resin-1: D.E.R. 728 Epoxy resin was obtained from Dow Chemicals, Inc., Minneapolis, Minn. (provides durability).

Base resin-2: Polybutadiene resin was obtained from Ricon Polymers, Inc., CO. (provides flexibility).

Catalyst: ANCAMIN 1110 or 54 Amine was obtained from AirProducts, Inc., OH.

| constituent | weight percentage |
|---|---|
| Aluminum Trihydrate | 84.8 |
| D.E.R. 728 Epoxy resin | 11.0 |
| Polybutadiene | 4.0 |
| ANCAMIN 1110 or 54 Amine | 0.2 |
| | 100.0 |

Example 4

Product with Shine

Filler: Kaolin with a mean diameter of 5μ was obtained from H.M. Royal, NJ.

Base resin-1: ISO NPG-based unsaturated polyester of 1,400 or 1,500 centipoise was obtained from Ashland, Teterborough, N.J.

Base resin-2: Methyl Methacrylate was obtained from ICI Acrylics, TN.

Base resin-3: D.E.R. 728 Epoxy resin was obtained from Dow Chemicals, Inc., Minneapolis, Minn.

Catalyst-1: Benzoyl Peroxide or Methyl-ethyl-ketone-peroxide with promoter was obtained from AtoChem, Mamaroneck, N.Y.

Catalyst-2: ANCAMIN 1110 or 54 Amine was obtained from AirProducts, Inc., OH.

The promoter is typically about 10% of the catalyst. The amine catalyst is provided for the epoxy resin, while the benzoyl peroxide or MEK peroxide catalyst is used for the polyester and methyl methacrylate. The methyl methacrylate adds shine to the granule.

| constituent | weight percentage |
|---|---|
| Kaolin | 84.7 |
| ISO NPG-based unsaturated polyester | 5.0 |
| Methyl Methacrylate | 5.0 |
| epoxy resin | 5.0 |
| Benzoyl Peroxide, or Methyl-ethyl-ketone peroxide with promoter | 0.25 |
| ANCAMIN 1110 or 54 Amine | 0.05 |
| | 100.0 |

Example 5

Light-weight Product

Filler-1: Aluminum trihydrate with a mean diameter of 15μ was obtained from Alcan Aluminum, OH.

Filler-2: Synthetic precipitated Silica was obtained from Huber, Pa.

Filler-3: Synthetic fumed Silica -Aeroseal 200 was obtained from H.M. Royal, NJ. Base resin: ISO NPG-based unsaturated polyester of 1,400 or 1,500 centipoise was obtained from Ashland, Teterborough, N.J.

| constituent | weight percentage |
|---|---|
| Aluminum Trihydrate | 45.0 |
| ISO NPG-based unsaturated polyester | 35.0 |
| Synthetic precipitated Silica | 15.0 |
| Synthetic fumed Silica | 5.0 |
| | 100.0 |

Equivalents

Those skilled in the art will recognize, or be able to ascertain using no more than routine experimentation, many equivalents to the specific embodiments of the invention described herein. Such equivalents are intended to be encompassed by the following claims.

All references disclosed herein are incorporated by reference in their entirety.

What I claim is:

1. A method for forming granules of a powder and a polymeric resin, comprising:
   aerating a dry powder,
   applying a liquid polymeric resin to the aerated powder to produce wetted particles of powder, and
   agglomerating under shear the wetted particles of powder to produce granules.

2. The method of claim 1, further comprising curing said granules to produce cured granules.

3. The method of claim 2, wherein said curing step is carried out by applying curing conditions during the agglomeration step sufficient to arrest further agglomeration, thereby determining particle size.

4. The method of claim 2, further comprising post-curing the granules after agglomeration has been arrested in a location remote from that where said agglomeration occurred.

5. The method of claim 2, wherein the agglomeration is carried out over a period of at least one minute under agglomeration and curing conditions to produce a batch of granules having an average particle size of between 8 and 140 mesh.

6. The method of claim 1, wherein the aeration and agglomeration are carried out in a rotary blade mixer.

7. The method of claims 1, 2, 3, 4, 6, or 5, wherein the agglomeration step is carried out under high shear forces to produce densely packed granules.

8. The method of claim 7, further comprising adding pigment to the powder or to the liquid polymeric resin to color the granules produced by agglomeration.

9. The method of claims 1, 2, 3, 4, 6, or 5, further comprising adding pigment to the powder or to the liquid polymeric resin to color the granules produced by agglomeration.

10. The method of claim 1, wherein said liquid polymeric resin is a thermoset-resin or a thermoplastic-polymer-resin.

11. A method for manufacturing granules of a particular size comprising:
    introducing a dry powder into an agglomerator,
    introducing a liquid polymeric resin into said agglomerator,
    applying agglomeration conditions in said agglomerator to obtain granules formed of said powder and said liquid polymeric resin, applying curing conditions within said agglomerator to substantially slow or arrest further agglomeration.

12. The method of claim 11, wherein said powder is aerated before said liquid polymeric resin is added to said agglomerator.

13. The method of claim 11, wherein said liquid polymeric resin is added to said aerated powder during agglomeration conditions.

14. The method of claim 11, wherein said liquid polymeric resin is added to said aerated powder before applying agglomeration conditions.

15. The method of claim 11, wherein the curing conditions are applied to produce granules with an average size of between 8 and 140 mesh.

16. The method of claim 11, wherein the agglomeration conditions are applied to produce growth of granules for a period of at least 1 minute.

17. The method of claim 11, wherein said liquid polymeric resin is a thermoset-resin or a thermoplastic-polymer-resin.

* * * * *